UNITED STATES PATENT OFFICE.

ELLIS S. BLOOMFIELD, OF ELIZABETH, NEW JERSEY.

IMPROVEMENT IN MANUFACTURE OF ROPE AND CORDAGE.

Specification forming part of Letters Patent No. 208,286, dated September 24, 1878; application filed December 14, 1877.

*To all whom it may concern:*

Be it known that I, ELLIS S. BLOOMFIELD, of Elizabeth, in the county of Union and State of New Jersey, have invented a new and useful Improvement in the Art of Manufacturing Rope, Twine, or Cordage from Manila, Sisal, or New Zealand Hemp; and I do declare the following to be a full and exact description thereof.

The nature of the invention consists in the use of soap-stone, combined with oil, an alkali, and water, whereby, in the application of the same to the hemp or fibrous material, the manufacture of rope or twine is facilitated and improved, and a smooth and superior rope produced.

The following is a comprehensive description of my invention and claim.

I take powdered soap-stone, and add thereto a sufficient quantity of oil, an alkali, and water to form a solution of the proper consistency, and then saturate the hemp, which is to be combed out in the first process of manufacture. This assists the fibers to separate, one from the other, owing to the repellent nature of the solution applied, and thereby the process of combing out the hemp by machinery is more effectually accomplished. Subsequently, by evaporation, this solution, as applied in the first instance, develops a pasty or gluey property, and causes the fibers to adhere to each other, and thus, by confining the fibrous ends together along the lay of the strands or yarns during the operation of spinning or twisting, a smooth surface is imparted to the rope or twine.

It is found desirable to also add to the above-mentioned ingredients a small quantity of borax, sufficient to soften and bleach the fibrous material, and a quantity of clay to assist in producing a glazed and lustrous appearance; but as these latter ingredients are intended to produce effects independent and distinct from the principal ingredient first described, I do not therefore limit myself to their incorporation therewith.

To form a combination of the above-mentioned materials the following proportions may be used, viz: Take one part of borax, two of sal-soda, four of tallow, eight of oil, (animal or fish oil,) and six parts of water. To these, added together and boiled, add three parts of clay and six parts of soap-stone, and a sufficient quantity of water to form a solution of the proper consistency.

What I claim as my invention, and desire to secure by Letters Patent, is—

An improvement in the art of manufacturing rope, twine, or cordage from Manila, Sisal, or New Zealand hemp, consisting of the application of soap-stone, combined with oil, an alkali, and water, in the process of manufacturing rope, twine, or cordage, substantially in the manner and for the purpose herein set forth.

ELLIS S. BLOOMFIELD.

Witnesses:
　H. E. TREMAIN,
　THEO. CLARKSON.